May 31, 1932.  R. G. AREY  1,861,255
INSTRUMENT BALANCING DEVICE
Filed Oct. 22, 1931
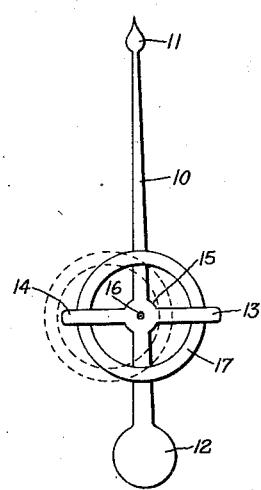
Inventor:
Ralph G. Arey,
by Charles E. Mulla
His Attorney.

Patented May 31, 1932

1,861,255

UNITED STATES PATENT OFFICE

RALPH G. AREY, OF SWAMPSCOTT, MASSACHUSETTS, ASSIGNOR TO GENERAL ELECTRIC COMPANY, A CORPORATION OF NEW YORK

INSTRUMENT BALANCING DEVICE

Application filed October 22, 1931. Serial No. 570,421.

My invention relates to indicating instruments and in particular to means for and methods of balancing the moving elements of indicating instruments.

A well known manner of balancing the deflecting elements of sensitive instruments is to provide the moving element with projecting arms which are threaded to receive adjustable weights which are drilled and tapped to permit mounting on the arms. The center of gravity is changed by rotating the weights to cause them to move along the threaded portions of the projecting arms. This method of balancing requires both care and the expenditure of considerable time.

It is an object of my invention to provide means for balancing the indicating elements whereby the operation may be carried out more quickly than in means heretofore employed. Another object of my invention is to provide an instrument pointer and a balancing weight of simplified manufacture. Other objects and advantages will become apparent as the description proceeds.

In accordance with my invention I provide a portion of the moving element preferably the pointer of the instrument with projecting portions. I provide a balancing weight which is frictionally held in position by the projections in a manner which permits ready adjustment of the balancing weight in any desired direction. The features of my invention which I believe to be novel and patentable will be pointed out in the claims appended hereto.

For a more complete understanding of my invention reference may be had to the accompanying drawing illustrating an embodiment of my invention in which a balancing weight is attached to the pointer of an instrument. The pointer or indicating hand 10 which may be used with any type of indicating instrument has an index 11 at one end thereof and a counter-weight 12 at the opposite end thereof. Laterally projecting arms 13 and 14 are provided at an intermediate portion of the hand 10. The width of the material at the hub or junction of the hand with the lateral projections may be somewhat increased to form a reinforced portion 15. A hole 16 is provided in the center of this portion to receive a shaft or pin by means of which the pointer 10 may be attached to a moving element, not shown. Although the pointer and projecting arms may be constructed in any suitable manner, I prefer to produce the pointer as an integral piece by stamping or punching from sheet metal. In order to balance the device I provide an adjustable weight 17, composed of a flat piece having a large part of its central portion cut away. The weight 17 may if desired take the form of a flat ring punched or stamped from sheet metal. The ring-shaped weight 17 may be attached to the pointer by placing the ring over the hub of the pointer and far enough to the right to allow the right hand portion of the ring to drop below the end of the projection 13. The weight 17 is then moved to the left until it reaches the position shown by the dotted lines so that it extends beyond the end of projection 14. The left hand portion of the ring is thereupon pressed downward so as to slightly deform the ring and pointer and the ring is moved to the right. A light pressure between the parts results from the bending stresses produced by the deformation of ring-shaped weight 17 and portions of the pointer so that the ring 17 is held in place by frictional engagement with the hand 10 and the projections 13 and 14. It will be seen that the position of the weight 17 may readily be adjusted in any direction necessary to balance the pointer and that the friction will be sufficient to maintain the ring in the proper position when the position of balance has been found. In order to insure the maintenance of the ring in this position I may in some cases place a minute quantity of a suitable adhesive substance at each point where the ring joins either the projecting arms or the hand of the pointer. It will be understood that I would use only a light substance, such as beeswax or shellac, and in such a small quantity that the balance would not be disturbed.

While I have described my invention in concrete form and as operating in a specific manner in accordance with the provisions of the patent statutes, it should be understood that I do not limit my invention thereto since various modifications thereof will suggest themselves to those skilled in the art without departing from the spirit of my invention, the scope of which is set forth in the appended claims.

What I claim as new and desire to secure by Letters Patent of the United States is:

1. Means for balancing a rotatable element comprising a hub co-axial with the axis of rotation of said element, radial projections on such hub, and an adjustable substantially ring-shaped balancing weight surrounding said hub and the axis of rotation of said element and frictionally supported between alternate radial projections of said hub.

2. An instrument pointer comprising a hand having an index and a counterweight at opposite ends thereof, lateral members projecting from an intermediate portion of said hand and lying substantially along a common plane with said hand, and a relatively flat adjustable balancing weight, the center portion of which is cut away, said balancing weight lying substantially along the plane of said hand and projecting members surrounding their junction and being held in slidable engagement with said hand by said projecting members.

3. In combination, an angularly deflecting instrument pointer having portions projecting radially from its center of rotation, and a substantially ring-shaped adjustable balancing weight surrounding said center of rotation and slidably held in frictional engagement with said pointer by said projections.

4. In combination, an instrument pointer having a pair of oppositely projecting transverse arms and a substantially ring-shaped adjustable balancing weight, lying substantially along the plane of said pointer and arms, surrounding the portion at which said pointer and arms are joined and slidably attached to said pointer by said projecting arms.

5. In an indicating instrument, a pointer, a pair of arms projecting oppositely from a portion thereof, a substantially ring-shaped adjustable balancing weight lying substantially along the plane of said pointer and arms, engaging said pointer on either side of the junction of said projecting arms with said pointer and being slidably and frictionally held thereagainst by said projecting arms.

6. In combination with the moving element of an indicating instrument, balancing means therefor comprising a hub member, radial projections upon said hub member, an adjustable substantially ring-shaped balancing weight located around said hub member, and slidably supported between alternate projections of said hub.

In witness whereof, I have hereto set my hand.

RALPH G. AREY.